(12) United States Patent
Chen et al.

(10) Patent No.: US 11,800,556 B2
(45) Date of Patent: Oct. 24, 2023

(54) INFORMATION TRANSMISSION METHOD, NETWORK DEVICE, AND TERMINAL

(71) Applicant: VIVO MOBILE COMMUNICATION CO., LTD., Guangdong (CN)

(72) Inventors: Xiaohang Chen, Chang'an Dongguan (CN); Peng Sun, Chang'an Dongguan (CN); Zhi Lu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 393 days.

(21) Appl. No.: 17/144,007

(22) Filed: Jan. 7, 2021

(65) Prior Publication Data

US 2021/0235488 A1 Jul. 29, 2021

Related U.S. Application Data

(63) Continuation of application No. PCT/CN2019/094519, filed on Jul. 3, 2019.

(30) Foreign Application Priority Data

Jul. 9, 2018 (CN) .......................... 201810746742.7

(51) Int. Cl.
*H04W 74/00* (2009.01)
*H04W 72/04* (2023.01)
*H04W 76/10* (2018.01)

(52) U.S. Cl.
CPC ......... *H04W 74/004* (2013.01); *H04W 72/04* (2013.01); *H04W 76/10* (2018.02)

(58) Field of Classification Search
CPC . H04W 76/10; H04W 72/044; H04W 74/004; H04W 72/04
See application file for complete search history.

(56) References Cited

U.S. PATENT DOCUMENTS

| | | | |
|---|---|---|---|
| 2016/0212737 | A1 | 7/2016 | Jang et al. |
| 2018/0092104 | A1 | 3/2018 | Sheng et al. |
| 2018/0124626 | A1 | 5/2018 | Tsai et al. |

(Continued)

FOREIGN PATENT DOCUMENTS

| | | |
|---|---|---|
| CN | 107211015 A | 9/2017 |
| CN | 107872290 A | 4/2018 |
| WO | 2017/209570 A1 | 12/2017 |

OTHER PUBLICATIONS

3rd Generation Partnership Project, "Technical Specification Group Radio Access Network," 3GPP TR 38.802, R1-1715720, pp. 1-134, (Mar. 3, 2017).

(Continued)

*Primary Examiner* — Raj Jain
(74) *Attorney, Agent, or Firm* — Maschoff Brennan (57) ABSTRACT

An information transmission method, a network device, and a terminal are provided. The method includes: receiving a preamble; receiving an uplink signal on a target multiple access resource; determining a target terminal based on the uplink signal; and determining target uplink information of the target terminal based on a target multiple access MA signature, where the target multiple access resource is determined based on the preamble, and/or the target MA signature is determined based on the preamble.

20 Claims, 6 Drawing Sheets

(56) References Cited

U.S. PATENT DOCUMENTS

| | | |
|---|---|---|
| 2018/0183645 A1 | 6/2018 | Meng |
| 2020/0059960 A1* | 2/2020 | Shimezawa .......... H04L 1/1809 |
| 2020/0154423 A1* | 5/2020 | Wang ..................... H04B 1/69 |
| 2020/0187259 A1* | 6/2020 | Liu ........................ H04B 7/088 |
| 2021/0235488 A1* | 7/2021 | Chen ..................... H04W 74/08 |

OTHER PUBLICATIONS

MCC Support, "Final Report of 3GPP TSG RAN WGI #92bis v1.0.0," 3GPP TSG RAN WG1 Meeting #93, R1-1805801, pp. 1-195, (May 15, 2018).
Extended European Search Report dated Aug. 27, 2021 as received in Application No. 19834151.3.
Chinese Office Action dated Jan. 5, 2021 as received in application No. 201810746742.7.
"Considerations on Procedures related to NoMA" 3GPP TSG RAN WG1 Meeting #93, R1-1805842, Busan, Korea, May 21-25, 2018. ZTE.
"Discussion on NoMA related procedure" 3GPP TSG RAN WG1 Meeting #93, R1-1806753, Busan, Korea, May 21-25, 2018. Samsung.

* cited by examiner

INFORMATION TRANSMISSION METHOD, NETWORK DEVICE, AND TERMINAL

CROSS-REFERENCE TO RELATED APPLICATIONS

This application is continuation application of PCT International Application No. PCT/CN2019/094519 filed on Jul. 3, 2019, which claims priority to Chinese Patent Application No. 201810746742.7 filed in China on Jul. 9, 2018, the disclosures of which are incorporated in their entireties by reference herein.

TECHNICAL FIELD

This disclosure relates to the field of communications technologies, and in particular, to an information transmission method, a network device, and a terminal.

BACKGROUND

The fifth generation (5th Generation, 5G) mobile communications system, also known as new radio (New Radio, NR), can adapt to more diverse scenarios and service requirements. Its main scenarios include: enhanced mobile broadband (enhanced Mobile Broadband, eMBB) communications, large-scale Internet of Things (massive Machine Type Communications, mMTC), and ultra-reliable and low latency communications (Ultra-Reliable and Low-Latency Communications, URLLC). These scenarios impose requirements such as high reliability, low latency, large bandwidth, and wide coverage on a system.

In an uplink transmission mode, a terminal can get uplink timing advance (Timing Advance, TA) information through a random access process to obtain uplink timing synchronization, and then send uplink data through dynamic scheduling or semi-static scheduling. To improve system capacity and resource utilization, a plurality of terminals can transmit in a non-orthogonal manner on a same resource. When terminals use a non-orthogonal technology to send uplink signals, a network device may detect uplink signals from the plurality of terminals on the same resource, and need to distinguish between uplink information from different terminals, which increases reception complexity and processing delay of the network device.

SUMMARY

Some embodiments of this disclosure provide an information transmission method, a network device, and a terminal to solve problems of high reception complexity and processing delay of a network device during a non-orthogonal uplink transmission.

According to a first aspect, some embodiments of this disclosure provide an information transmission method, applied to a network device side and including:
  receiving a preamble;
  receiving an uplink signal on a target multiple access resource;
  determining a target terminal based on the uplink signal; and
  determining target uplink information of the target terminal based on a target multiple access MA signature, where the target multiple access resource is determined based on the preamble, and/or the target MA signature is determined based on the preamble.

According to a second aspect, some embodiments of this disclosure further provide a network device, including:
  a first receiving module, configured to receive a preamble;
  a second receiving module, configured to receive an uplink signal on a target multiple access resource;
  a first determining module, configured to determine a target terminal based on the uplink signal; and
  a second determining module, configured to determine target uplink information of the target terminal based on a target multiple access MA signature, where the target multiple access resource is determined based on the preamble, and/or the target MA signature is determined based on the preamble.

According to a third aspect, some embodiments of this disclosure provide a network device, where the network device includes a processor, a memory, and a computer program stored in the memory and running on the processor; and when the processor executes the computer program, the steps of the foregoing information transmission method are implemented.

According to a fourth aspect, some embodiments of this disclosure provide an information transmission method, applied to a terminal side and including:
  sending a preamble; and
  sending an uplink signal on a target multiple access resource by using a target multiple access MA signature, where the uplink signal carries a terminal identifier of the terminal, and the target multiple access resource corresponds to the preamble, and/or the target MA signature corresponds to the preamble.

According to a fifth aspect, some embodiments of this disclosure provide a terminal, including:
  a first sending module, configured to send a preamble; and
  a second sending module, configured to send an uplink signal on a target multiple access resource by using a target multiple access MA signature, where the uplink signal carries a terminal identifier of the terminal, and the target multiple access resource corresponds to the preamble, and/or the target MA signature corresponds to the preamble.

According to a sixth aspect, some embodiments of this disclosure further provide a terminal, where the terminal includes a processor, a memory, and a computer program stored in the memory and running on the processor; and when the processor executes the computer program, the steps of the foregoing information transmission method are implemented.

According to a seventh aspect, some embodiments of this disclosure provide a computer-readable storage medium, where the computer-readable storage medium stores a computer program, and when a processor executes the computer program, steps of the foregoing information transmission method on the network device side or the terminal side are implemented.

In this way, in some embodiments of this disclosure, the foregoing technical solutions are adopted, a collision probability of non-orthogonal transmissions is reduced by using preambles, and reception and detection complexity and processing delay of an uplink signal can also be reduced through a constraint relationship between a preamble and a target multiple access resource or an MA signature.

BRIEF DESCRIPTION OF DRAWINGS

To describe the technical solutions in some embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to facilitate a more thorough understanding of this disclosure and convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "comprise" "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. "And/or" in the specification and claims represents at least one of connected objects.

The technologies described in the specification are not limited to a long term evolution (Long Term Evolution, LTE)/LTE-Advanced (LTE-Advanced, LTE-A) system, and are also applicable to various wireless communications systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. Terms "system" and "network" are often used interchangeably.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
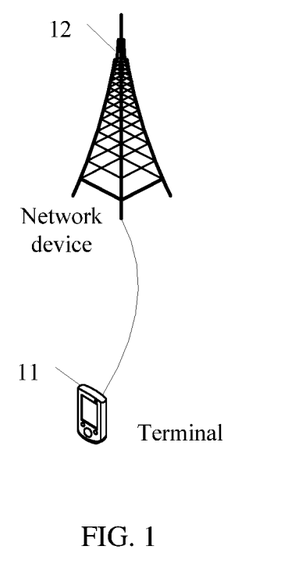
FIG. 1 is a diagram of a mobile communications system to which some embodiments of this disclosure may be applied.

FIG. 1 shows a diagram of a wireless communications system to which some embodiments of this disclosure may be applied. The wireless communications system includes a terminal 11 and a network device 12. The terminal 11 may also be referred to as a terminal device or user equipment (User Equipment, UE). The terminal 11 may be a terminal side device such as a mobile phone, a tablet computer (Tablet Personal Computer), a laptop computer (Laptop Computer), a personal digital assistant (Personal Digital Assistant, PDA), a mobile internet device (Mobile Internet Device, MID), a wearable device (Wearable Device), or an in-vehicle device. It should be noted that the terminal 11 is not limited to any specific type in some embodiments of this disclosure.

The network device 12 may be a base station or a core network, where the base station may be a base station of 5G or a later version (for example, gNB or 5G NR NB), or a base station in another communications system (for example, an eNB, a WLAN access point, or another access point). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a Node B, an evolved node B (eNB), a home NodeB, a home evolved NodeB, a WLAN access point, a Wi-Fi node, or some other appropriate terms in the art. The base station is not limited to a specific technical term, providing that a same technical effect is achieved. It should be noted that the base station in an NR system is merely used as an example in some embodiments of this disclosure, but the base station is not limited to any specific type.

The base station may communicate with the terminal 11 under the control of a base station controller. In various examples, the base station controller may be a part of the core network or some base stations. Some base stations may exchange control information or user data with the core network through backhaul. In some examples, some of these base stations may communicate with each other directly or indirectly through backhaul links that may be wired or wireless communication links. The wireless communications system may support operations on a plurality of carriers (waveform signals of different frequencies). A multi-carrier transmitter may transmit modulated signals simultaneously on the plurality of carriers. For example, each communication link may be used to transmit a multi-carrier signal modulated according to various radio technologies.

Each modulated signal may be sent on a different carrier and may carry control information (for example, a reference signal or a control channel), overhead information, data, and the like.

The base station may communicate wirelessly with the terminal 11 through one or more access point antennas. Each base station may provide communication coverage for its respective coverage area. A coverage area of an access point may be divided into sectors that are only a part of the coverage area. The wireless communications system may include different types of base stations (for example, macro base stations, micro base stations, or picocell base stations). The base station may also use different radio technologies, such as cellular and WLAN radio access technologies. The base station may be associated with deployment of the same or different access networks or operators. Coverage areas of different base stations (including coverage areas of the same or different types of base stations, coverage areas utilizing the same or different radio technologies, or coverage areas belonging to the same or different access networks) may overlap.

Communication links in the wireless communications system may include an uplink for carrying an uplink (Uplink, UL) transmission (for example, from the terminal 11 to the network device 12), or a downlink for carrying a downlink (Downlink, DL) transmission (for example, from the network device 12 to the terminal 11). The UL transmission may also be referred to as a reverse link transmission, while the DL transmission may also be referred to as a forward link transmission.

Figure 2:
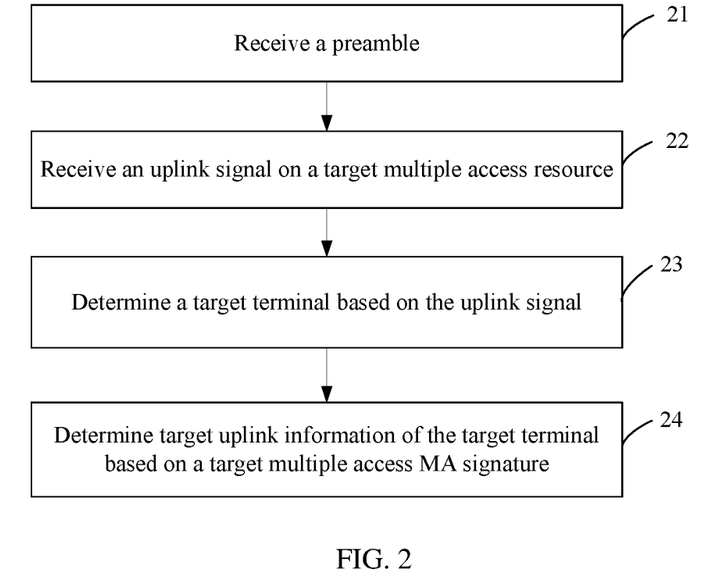
FIG. 2 is a schematic flowchart of an information transmission method on a network device side according to some embodiments of this disclosure.

Some embodiments of this disclosure provide an information transmission method, applied to a network device side. As shown in FIG. 2, the method includes the following steps.

Step 21: Receive a preamble.

Figure 3:
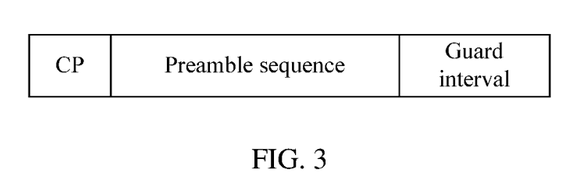
FIG. 3 is a schematic structural diagram of a preamble according to some embodiments of this disclosure.

If a terminal needs to send uplink data, uplink timing synchronization has to be obtained first through a random access process, that is, to obtain uplink timing advance TA information from a network device side. After the uplink synchronization is obtained, the terminal may send the uplink data through dynamic scheduling or semi-static scheduling. When the uplink data packet is small, the manner of sending the uplink data after obtaining the uplink synchronization through the random access process may lead to resource and power consumption. To avoid unnecessary resource and power consumption, the terminal is allowed to send the uplink data in an unsynchronized state. Similar to the random access process, the terminal is also in the unsynchronized state when sending the preamble (preamble). Therefore, impact of transmission delay is required to be canceled by adding a cyclic prefix (Cyclic Prefix, CP) into the preamble. As shown in FIG. 3, the preamble includes: a CP, a preamble sequence, and a guard interval (Guard).

Step 22: Receive an uplink signal on a target multiple access resource.

The uplink signal herein includes an uplink reference signal and an uplink data channel, and the uplink data channel is sent by employing a non-orthogonal transmission technology. Specifically, the step may be: receiving the uplink signal sent on the target multiple access resource by a terminal in a non-orthogonal transmission mode. The uplink signal may include multiple access (Multiple Access, MA) signature (signature)—based data, or include DMRS and MA signature-based data. The multiple access resource herein means a transmission resource multiplexed by a plurality of terminals when performing non-orthogonal uplink transmissions, namely, the resource in which the uplink data channel of the terminal is located.

Step 23: Determine a target terminal based on the uplink signal.

A network device may determine the target terminal based on a terminal identifier carried in the uplink signal. The terminal may add a terminal identifier in the following manners, for example: sending the terminal identifier through a medium access control (Medium Access Control, MAC) layer control element (Control Element, CE); scrambling the terminal identifier into a cyclic redundancy check (Cyclic Redundancy Check, CRC) code for sending; adding the terminal identifier into data information for sending; and appending the terminal identifier information to a transmission block for sending.

Step 24: Determine target uplink information of the target terminal based on a target multiple access MA signature.

An MA signature is used to determine target uplink information of the terminal in the uplink signal. The uplink information herein particularly refers to the uplink data sent by the terminal. The target multiple access resource is determined based on the preamble, and/or the target MA signature is determined based on the preamble. That the target multiple access resource is determined based on the preamble means there is a correspondence between the preamble and the multiple access resource. When receiving the preamble, the network device may determine the corresponding target multiple access resource based on the preamble. In this way, the uplink signal may be detected directly on the determined target multiple access resource, without performing detection on all possible multiple access resources, which may decrease detection times, and reduce detection complexity and processing delay. In another aspect, that the target MA signature is determined based on the preamble means there is a correspondence between the preamble and the MA signature. When receiving the preamble, the network device may determine the corresponding target MA based on the preamble. In this way, after the uplink signal is detected, the target uplink information of the target terminal may be determined directly through the target MA signature, without using all possible MA signatures to perform data detection, which may decrease detection times, and reduce detection complexity and processing delay. It should be noted that the preamble may have a correspondence only with the multiple access resource or the MA signature, or have a correspondence not only with the multiple access resource, but also with the MA signature.

When the preamble has a correspondence only with the multiple access resource, and the preamble is not associated with the MA signature, the network device performs, after receiving the preamble, uplink signal detection on the multiple access resource corresponding to the preamble. During detection on data in the uplink signal, it is required to perform selection among all possible MA signatures for data detection. The selection order may be based on the order of the MA signatures, or may be random.

Figure 4:
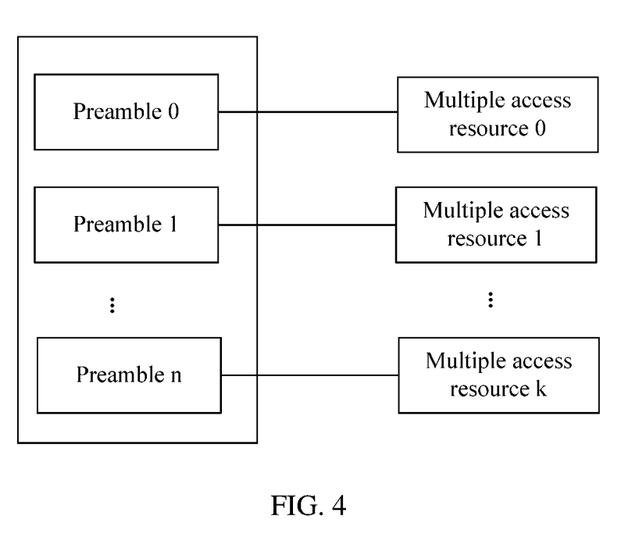
FIG. 4 is a schematic diagram of a mapping relationship between preambles and multiple access resources according to some embodiments of this disclosure.

The correspondence between the preamble and the multiple access resource may be: at least one preamble corresponds to one multiple access resource, that is, as shown in FIG. 4 where preamble 1 corresponds to multiple access resource 1, preamble 2 corresponds to multiple access resource 2, preamble 3 corresponds to multiple access resource 3, . . . , and preamble n corresponds to multiple access resource k, where k=n mod L, n is a number of the preamble in a preamble pool, and L is a quantity of the multiple access resources.

Similarly, when the preamble has a correspondence only with the MA signature, and the preamble is not associated with the multiple access resource, the network device needs to perform selection among all possible multiple access resources for signal detection when performing uplink signal detection. The selection order may be based on the order of the multiple access resources, or may be random.

Similar to the correspondence between the preamble and the multiple access resource, the correspondence between the preamble and the MA signature may be: at least one preamble corresponds to one MA signature.

Before step 21, the method further includes: configuring at least one preamble for the target terminal. Because there are a relatively large quantity of preambles in a preamble pool maintained by the system, resource collision may not occur frequently even if a large quantity of terminals perform non-orthogonal uplink transmissions simultaneously. In addition, a quantity of preambles configured for a terminal may be determined based on a quantity of terminals performing non-orthogonal uplink transmissions. For example, when the quantity of terminals performing non-orthogonal uplink transmissions is greater than the quantity of the preambles in the preamble pool, the network device may configure at least two preambles for one terminal. In this way, the terminal may select one preamble from the at least two preambles to perform a non-orthogonal uplink transmission, and the terminal may select a preamble more flexibly, increasing capacity of preambles, and reducing a probability that a plurality of terminals select a same preamble. It should be noted that, there may be an overlap between preambles configured for different terminals by the network device. For example, the network device has configured preamble 1, preamble 2, preamble 3, and preamble 4 for terminal 1, and has configured preamble 2, preamble 3, and preamble 5 for a terminal 2.

Optionally, a time-frequency resource used for sending a preamble in some embodiments of this disclosure is predefined or configured by the network device. Before step 22, the method further includes: configuring at least one multiple access resource for the target terminal. The terminal may perform a non-orthogonal uplink transmission on the multiple access resource simultaneously together with other terminals. Similar to the preamble configuration, the network device may configure at least two multiple access resources for one terminal. In this way, the terminal may select one multiple access resource from the at least two multiple access resources for performing a non-orthogonal uplink transmission, and the terminal may select a multiple access resource more flexibly.

Before step 24, the method further includes: configuring at least one MA signature for the target terminal. Similar to the preamble configuration, the network device may determine a quantity of MA signatures configured for a terminal based on the quantity of terminals performing non-orthogonal uplink transmissions. For example, when the quantity of terminals performing non-orthogonal uplink transmissions is greater than the quantity of the MA signatures, the network device may configure at least two MA signatures for one terminal. In this way, the terminal may select one MA signature from the at least two MA signatures to perform a non-orthogonal uplink transmission, and the terminal may select an MA signature more flexibly, increasing capacity of MA signatures, and reducing a probability that a plurality of terminals select a same MA signature. It should be noted that, there may be an overlap between MA signatures configured for different terminals by the network device. For example, the network device has configured MA signature 1, MA signature 2, MA signature 3, and MA signature 4 for a terminal 1, and has configured MA signature 2, MA signature 3, and MA signature 5 for a terminal 2.

A bandwidth part (Bandwidth Part, BWP) in which the target multiple access resource is located in some embodiments of this disclosure is the same as a BWP in which the preamble is located. A frequency domain resource granularity (or referred to as a frequency domain transmission unit, a minimal frequency transmission unit, or the like) of a target multiple access resource may be predefined (for example, defined by a protocol), or may be configured by a network device. The target multiple access resource includes at least one frequency domain transmission unit, and the frequency domain transmission unit includes: a resource block group (Resource Block Group, RBG), a resource block (Resource Block, RB), and a resource element group (Resource Element Group, REG) or a resource element (Resource Element, RE). The frequency domain transmission unit is determined based on a sub-carrier spacing of the BWP in which the target multiple access resource is located. That is, the frequency domain resource granularity of the target multiple access resource may be a resource block group RBG, a resource block RB, and a resource element group REG or a resource element RE. The frequency domain resource granularity of the target multiple access resource is determined based on the sub-carrier spacing of the BWP in which the target multiple access resource is located, that is, the frequency domain resource granularity is associated with the sub-carrier spacing, which means that configuration of the frequency domain resource granularity is associated with the sub-carrier spacing of a current BWP.

In the information transmission method in some embodiments of this disclosure, the terminal reduces a collision probability of non-orthogonal transmissions by using preambles, and the network device may also reduce reception and detection complexity and processing delay of an uplink signal through a constraint relationship between a preamble and a target multiple access resource or an MA signature.

The information transmission method in different scenarios is separately described in detail in the foregoing embodiment. An embodiment below further describes a network device corresponding to the method with reference to an accompanying drawing.

Figure 5:
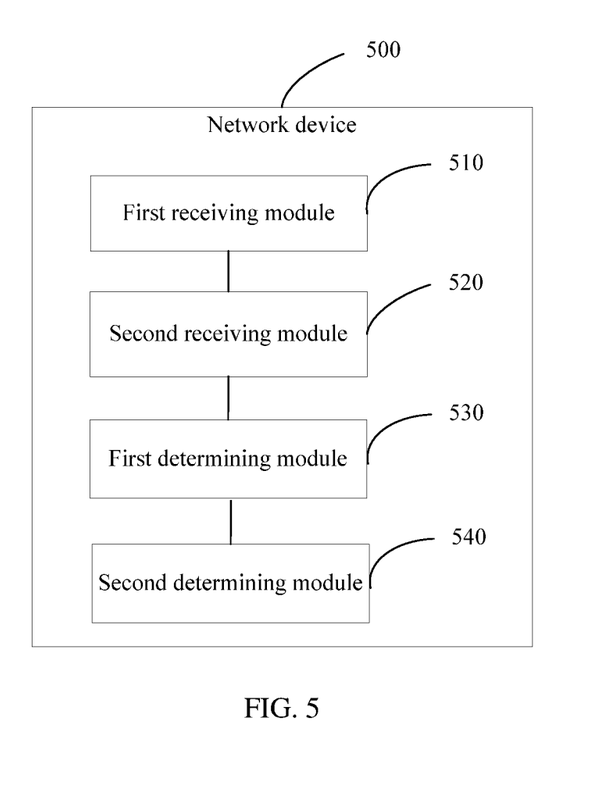
FIG. 5 is a schematic modular structural diagram of a network device according to some embodiments of this disclosure.

As shown in FIG. 5, a network device 500 according to some embodiments of this disclosure can implement details of the method in the embodiments and achieve a same effect, that is, receiving a preamble; receiving an uplink signal on a target multiple access resource; determining a target terminal based on the uplink signal; and determining target uplink information of the target terminal based on a target multiple access MA signature, where the target multiple access resource is determined based on the preamble, and/or the target MA signature is determined based on the preamble. The network device 500 specifically includes the following functional modules:

a first receiving module 510, configured to receive a preamble;

a second receiving module 520, configured to receive an uplink signal on a target multiple access resource;

a first determining module 530, configured to determine a target terminal based on the uplink signal; and a second determining module 540, configured to determine target uplink information of the target terminal based on a target multiple access MA signature, where the target multiple access resource is determined based on the preamble, and/or the target MA signature is determined based on the preamble.

The network device 500 further includes:
a first configuration module, configured to configure at least one preamble for the target terminal.

The network device 500 further includes:
a second configuration module, configured to configure at least one multiple access resource for the target terminal.

The network device 500 further includes:
a third configuration module, configured to configure at least one MA signature for the target terminal.

At least one preamble corresponds to one multiple access resource, and/or at least one preamble corresponds to one MA signature.

A bandwidth part BWP in which the target multiple access resource is located is the same as a BWP in which the preamble is located.

The target multiple access resource includes at least one frequency domain transmission unit, and the frequency domain transmission unit includes: a resource block group RBG, a resource block RB, and a resource element group REG or a resource element RE.

The frequency domain transmission unit is determined based on a sub-carrier spacing of the BWP in which the target multiple access resource is located.

It should be noted that, in actual implementation, the modules of the network device may be all or partially integrated in a physical entity or may be separated physically. For example, the foregoing first receiving module 510 and second receiving module 520 may be transceiving components that are separately disposed, or may be integrated in a transceiver; or, the foregoing first determining module 530 and second determining module 540 may be implemented in a form of software invoked by a processing component, and some of the modules may be implemented in a form of hardware. For example, the first determining module 530 and the second determining module 540 may be processing components that are separately disposed, or may be integrated in a processor for implementation. It should be noted that, implementation of other modules is similar thereto, and in an implementation process, the foregoing modules can be implemented by using a hardware integrated logical circuit in the processor component, or by using instructions in a form of software.

It should be noted that, the network device in some embodiments of this disclosure may reduce reception and detection complexity and processing delay of an uplink signal through a constraint relationship between a preamble and a target multiple access resource or an MA signature.

To better achieve the foregoing objective, an embodiment of this disclosure further provides a network device. The network device includes a processor, a memory, and a computer program stored in the memory and capable of running on the processor.

When the processor executes the computer program, the steps of the foregoing information transmission method are implemented. An embodiment of this disclosure further provides a computer-readable storage medium, where the computer-readable storage medium stores a computer program, and when a processor executes the computer program, the steps of the foregoing information transmission method are implemented.

Figure 6:
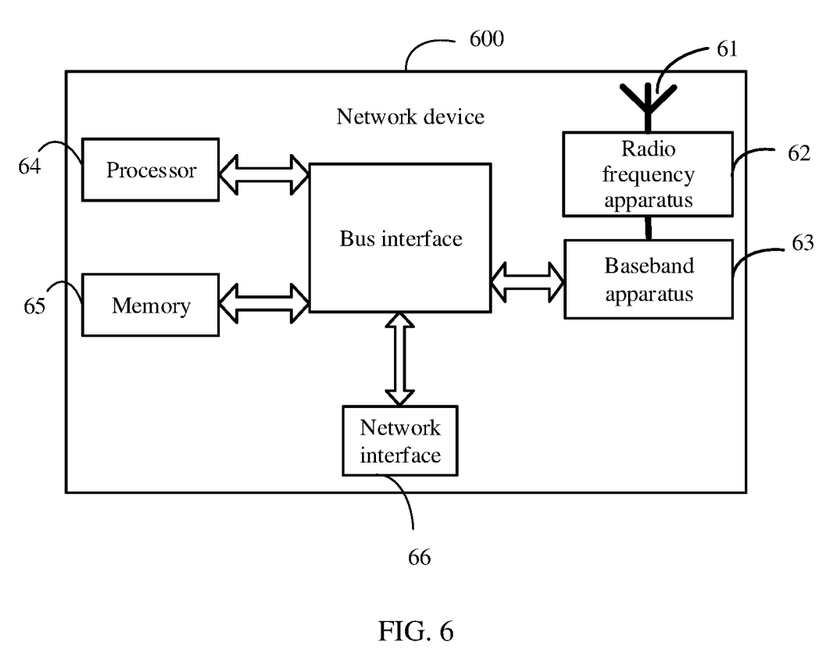
FIG. 6 is a block diagram of a network device according to some embodiments of this disclosure.

Specifically, an embodiment of this disclosure further provides a network device. As shown in FIG. 6, the network device 600 includes an antenna 61, a radio frequency apparatus 62, and a baseband apparatus 63. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes to-be-sent information, and sends the information to the radio frequency apparatus 62; and the radio frequency apparatus 62 processes the received information and then sends the information out by using the antenna 61.

The radio frequency apparatus may be located in the baseband apparatus 63. The method performed by the network device in the foregoing embodiment may be implemented in the baseband apparatus 63, and the baseband apparatus 63 includes a processor 64 and a memory 65.

The baseband apparatus 63 may include, for example, at least one baseband processing unit, where a plurality of chips are disposed on the baseband processing unit. As shown in FIG. 6, one of the chips is, for example, the processor 64, connected to the memory 65, to invoke the program in the memory 65 to perform the operations of the network device shown in the foregoing method embodiment.

The baseband apparatus 63 may further include a network interface 66, configured to exchange information with the radio frequency apparatus 62, where the interface is, for example, a common public radio interface (common public radio interface, CPRI).

The processor herein may be one processor, or may be a collective term for a plurality of processing components. For example, the processor may be a CPU, or may be an ASIC, or may be one or more integrated circuits configured to implement the method performed by the network device, for example, one or more microprocessors DSPs, or one or more field programmable gate arrays FPGAs. A storage component may be a memory, or may be a collective term for a plurality of storage components.

The memory 65 may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not constraint description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 65 described in this application is intended to include but is not limited to these and any other suitable types of memories.

Specifically, the network device in some embodiments of this disclosure further includes a computer program stored in the memory 65 and capable of running on the processor 64. The processor 64 invokes the computer program in the memory 65 to perform the method performed by the modules shown in FIG. 5.

Specifically, when being invoked by the processor 64, the computer program may be configured to execute the steps of: receiving a preamble;

receiving an uplink signal on a target multiple access resource;

determining a target terminal based on the uplink signal; and determining target uplink information of the target terminal based on a target multiple access MA signature, where the target multiple access resource is determined based on the preamble, and/or the target MA signature is determined based on the preamble.

The network device may be a base transceiver station (Base Transceiver Station, BTS) in a global system for mobile communications (Global System for Mobile Communication, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (Evolved NodeB, eNB or eNodeB), a relay station, or an access point in LTE, or may be a base station in a future 5G network, or the like, which is not limited herein.

The network device in some embodiments of this disclosure may reduce reception and detection complexity and processing delay of an uplink signal through a constraint relationship between a preamble and a target multiple access resource or an MA signature.

The information transmission method in this disclosure is described from the network device side in the foregoing embodiment. An embodiment below further describes the information transmission method on a terminal side with reference to an accompanying drawing.

Figure 7:
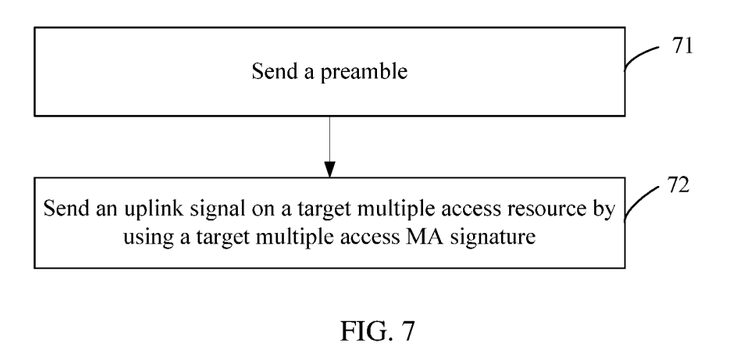
FIG. 7 is a schematic flowchart of an information transmission method of a terminal according to some embodiments of this disclosure.

As shown in FIG. 7, an information transmission method in some embodiments of this disclosure is applied to a terminal side, and includes the following steps.

Step 71: Send a preamble.

If a terminal needs to send uplink data, whether in an uplink synchronous transmission or an uplink non-synchronous transmission, the terminal needs to send a preamble to a network device to inform the network device. Before step 71, the method further includes: obtaining at least one preamble configured by the network device. To be specific, the network device may configure at least one preamble for the terminal. Because there are a relatively large quantity of preambles in a preamble pool maintained by a system, resource collision may not occur frequently even if a large quantity of terminals perform non-orthogonal uplink transmissions simultaneously. In addition, a quantity of preambles configured for a terminal may be determined based on a quantity of terminals performing non-orthogonal uplink transmissions. For example, when the quantity of terminals performing non-orthogonal uplink transmissions is greater than the quantity of the preambles in the preamble pool, the network device may configure at least two preambles for one terminal. In this way, the terminal may select one preamble from the at least two preambles to perform a non-orthogonal uplink transmission, and the terminal may select a preamble more flexibly, increasing capacity of preambles, and reducing a probability that a plurality of terminals select a same preamble. It should be noted that, there may be an overlap between preambles configured for different terminals by the network device.

Optionally, the terminal sends the selected preamble on a time-frequency resource that is configured or predefined by a network and used for sending a preamble.

Step 72: Send an uplink signal on a target multiple access resource by using a target multiple access MA signature.

The uplink signal herein includes an uplink reference signal and an uplink data channel, and the uplink data channel is sent by employing a non-orthogonal transmission technology. Specifically, the step may be: a terminal in a non-orthogonal transmission mode sends the uplink signal on the target multiple access resource. The uplink signal may include MA signature-based data, or include DMRS and MA signature-based data. The multiple access resource herein means a transmission resource multiplexed by a plurality of terminals when performing non-orthogonal uplink transmissions, namely, the resource in which the uplink data channel of the terminal is located.

Before step 72, the method further includes: obtaining at least one multiple access resource configured by the network device, and/or at least one MA signature configured by the network device. The terminal may select one multiple access resource from the at least one multiple access resource, and perform a non-orthogonal uplink transmission simultaneously together with another terminal. The network device may configure at least two multiple access resources for one terminal. In this way, the terminal may select one multiple access resource from the at least two multiple access resources for performing a non-orthogonal uplink transmission, and the terminal may select a multiple access resource more flexibly. In addition, for MA signatures, the network device may determine a quantity of MA signatures configured for a terminal based on the quantity of terminals performing non-orthogonal uplink transmissions. For example, when the quantity of terminals performing non-orthogonal uplink transmissions is greater than the quantity of the MA signatures, the network device may configure at least two MA signatures for one terminal. In this way, the terminal may select one MA signature from the at least two MA signatures to perform a non-orthogonal uplink transmission, and the terminal may select an MA signature more flexibly, increasing capacity of MA signatures, and reducing a probability that a plurality of terminals select a same MA signature. It should be noted that, there may be an overlap between MA signatures configured for different terminals by the network device.

At least one preamble corresponds to one multiple access resource, and/or at least one preamble corresponds to one MA signature. To be specific, a correspondence between a preamble and a multiple access resource may be: at least one preamble corresponds to one multiple access resource; and a correspondence between a preamble and an MA signature may be: at least one preamble corresponds to one MA signature.

Figure 8:
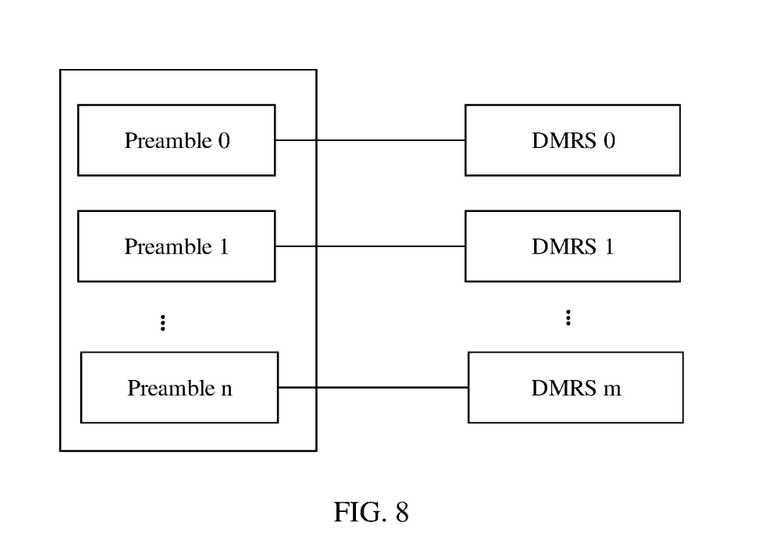
FIG. 8 is a schematic diagram of a mapping relationship between preambles and demodulation reference signals according to some embodiments of this disclosure.

The uplink signal carries a demodulation reference signal DMRS, and at least one preamble corresponds to one DMRS. The network device configures one or more DMRS configuration resources, and each DMRS configuration resource is associated with one preamble. That is, when a preamble is selected, configuration information of the DMRS, such as a DMRS port (Port), a scrambling code of the DMRS (Scrambling), and a time domain location of the DMRS, is determined. Specifically, if a quantity of preambles in a preamble pool is greater than a quantity of DMRSs in a DMRS pool, a plurality of preambles correspond to one DMRS; or if a quantity of preambles in a preamble pool is less than a quantity of DMRSs in a DMRS pool, one preamble corresponds to one DMRS. As shown in FIG. 8, preamble 1 corresponds to DMRS1, preamble 2 corresponds to DMRS2, preamble 3 corresponds to DMRS3, . . . , and preamble n corresponds to DMRS m, where m=n mod M, n is the quantity of preambles in the preamble pool, and M is the quantity of DMRSs in the DMRS pool.

A bandwidth part BWP in which the target multiple access resource is located is the same as a BWP in which the preamble is located. The target multiple access resource includes at least one frequency domain transmission unit, and the frequency domain transmission unit includes: a resource block group RBG, a resource block RB, and a resource element group REG or a resource element RE. That is, the frequency domain resource granularity of the target multiple access resource may be a resource block group RBG, a resource block RB, and a resource element group REG or a resource element RE. The frequency domain resource granularity of the target multiple access resource is determined based on the sub-carrier spacing of the BWP in which the target multiple access resource is located, that is, the frequency domain resource granularity is associated with the sub-carrier spacing, which means that configuration of the frequency domain resource granularity is associated with the sub-carrier spacing of a current BWP.

In the information transmission method in some embodiments of this disclosure, the terminal reduces a collision probability of non-orthogonal transmissions by using preambles, and the network device may also reduce reception and detection complexity and processing delay of an uplink signal through a constraint relationship between a preamble and a target multiple access resource or an MA signature.

The information transmission method in different scenarios is separately described in the foregoing embodiment. An embodiment below further describes a terminal corresponding to the method with reference to an accompanying drawing.

Figure 9:
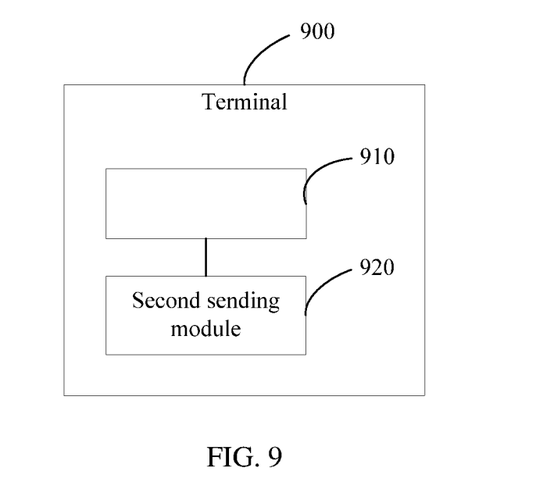
FIG. 9 is a schematic modular structural diagram of a terminal according to some embodiments of this disclosure.

As shown in FIG. 9, a terminal 900 in some embodiments of this disclosure can implement details of the method in the foregoing embodiment and achieve a same effect, that is, sending a preamble; and sending an uplink signal on a target multiple access resource using a target multiple access MA signature; where the uplink signal carries a terminal identifier of the terminal, and the target multiple access resource corresponds to the preamble, and/or the target MA signature corresponds to the preamble. The terminal 900 specifically includes the following functional modules:

a first sending module 910, configured to send a preamble; and a second sending module 920, configured to send an uplink signal on a target multiple access resource using a target multiple access MA signature, where the uplink signal carries a terminal identifier of the terminal, and the target multiple access resource corresponds to the preamble, and/or the target MA signature corresponds to the preamble.

The terminal 900 further includes:
a first obtaining module, configured to obtain at least one preamble configured by a network device.

The terminal 900 further includes:
a second obtaining module, configured to obtain at least one multiple access resource configured by the network device;
and/or,
a third obtaining module, configured to obtain at least one MA signature configured by the network device.

At least one preamble corresponds to one multiple access resource, and/or at least one preamble corresponds to one MA signature.

A bandwidth part BWP in which the target multiple access resource is located is the same as a BWP in which the preamble is located.

The target multiple access resource includes at least one frequency domain transmission unit, and the frequency domain transmission unit includes: a resource block group RBG, a resource block RB, and a resource element group REG or a resource element RE.

The uplink signal carries a demodulation reference signal DMRS, and at least one preamble corresponds to one DMRS.

It should be noted that, the terminal in some embodiments of this disclosure reduces a collision probability of non-orthogonal transmissions by using preambles, and the network device may reduce reception and detection complexity and processing delay of an uplink signal through a constraint relationship between a preamble and a target multiple access resource or an MA signature.

It should be noted that, similar to the functional modules on the network device side, in actual implementation, the modules of the terminal may be all or partially integrated in a physical entity or may be separated physically. For example, the foregoing first sending module 910 and second sending module 920 may be transceiving components that are separately disposed, or may be integrated in a transceiver. It should be noted that, implementation of other modules is similar thereto, and in an implementation process, the foregoing modules can be implemented by using a hardware integrated logical circuit in the processor component, or by using instructions in a form of software.

In other words, it should be understood that division of modules of the network device and the terminal is merely logical function division. The modules may be all or partially integrated in a physical entity or may be separated physically in actual implementation. In addition, the modules may be all implemented in a form of software invoked by a processing component, or may be all implemented in a form of hardware;

or some of the modules may be implemented in a form of software invoked by a processing component, and some of the modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar thereto. In addition, the modules may be all or partially integrated, or may be implemented independently. The processing component herein may be an integrated circuit, and has a signal processing capability. In an implementation process, steps of the foregoing method or the foregoing modules can be implemented by using a hardware integrated logical circuit in the processor component, or by using instructions in a form of software.

For example, the modules above may be one or more integrated circuits configured to implement the foregoing method, for example, one or more application-specific integrated circuits (Application-Specific Integrated Circuit, ASIC), or one or more microprocessors (digital signal processor, DSP), or one or more field programmable gate arrays (Field Programmable Gate Array, FPGA). For another example, when one of the foregoing modules is implemented in a form of program code invoked by a processing component, the processing component may be a general purpose processor, for example, a central processing unit (Central Processing Unit, CPU) or another processor that may invoke program code. For another example, the modules may be integrated and implemented in a form of a system-on-a-chip (system-on-a-chip, SOC).

Figure 10:
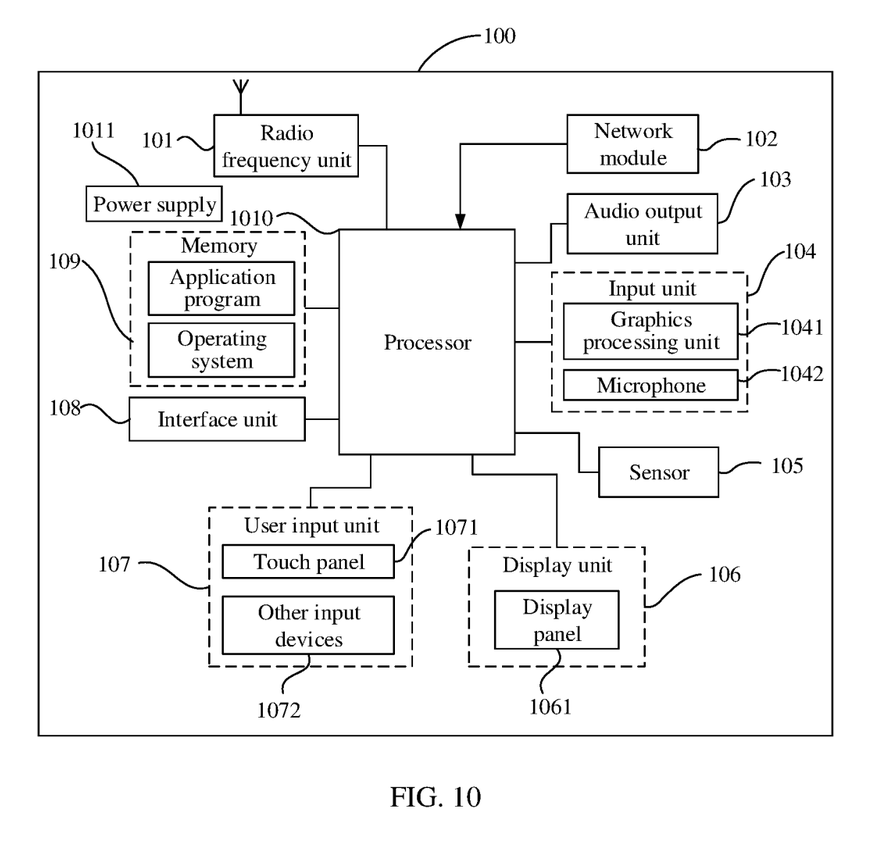
FIG. 10 is a block diagram of a terminal according to some embodiments of this disclosure.

To better achieve the foregoing objective, further, FIG. 10 is a schematic diagram of a hardware structure of a terminal for implementing each embodiment of this disclosure. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 1010, and a power supply 1011. A person skilled in the art may understand that the structure of the terminal shown in FIG. 10 does not constitute a limitation on the terminal. The terminal may be include more or fewer components than those shown in the figure, or some components are combined, or a different component arrangement is made. In some embodiments of this disclosure, the terminal includes but is not limited to a mobile phone, a tablet computer a notebook computer, a palmtop computer, an in-vehicle terminal, a wearable device, a pedometer, and the like.

The radio frequency unit 101 is configured to receive and send data under control of the processor 1010, and specifically configured to send a preamble; and send an uplink signal on a target multiple access resource by using a target multiple access MA signature, where the uplink signal carries a terminal identifier of the terminal, and the target multiple access resource corresponds to the preamble, and/or the target MA signature corresponds to the preamble.

The terminal in some embodiments of this disclosure reduces a collision probability of non-orthogonal transmissions by using preambles, and the network device may reduce reception and detection complexity and processing delay of an uplink signal through a constraint relationship between a preamble and a target multiple access resource or an MA signature.

It should be understood that, in some embodiments of this disclosure, the radio frequency unit 101 may be configured to receive and send a signal in an information sending/receiving or call process. Specifically, the radio frequency unit 101 receives downlink data from a base station and then sends the downlink data to the processor 1010 for processing; and sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may further communicate with a network and another device through a wireless communications system.

The terminal provides wireless broadband internet access for a user by using the network module 102, for example, helps the user send and receive e-mails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal reception tone or a message reception tone) that is related to a specific function performed by the terminal 100. The audio output unit 103 includes a speaker, a buzzer, a telephone receiver, and the like.

The input unit 104 is configured to receive an audio or video signal. The input unit 104 may include a graphics processing unit (Graphics Processing Unit, GPU) 1041 and a microphone 1042, and the graphics processing unit 1041 processes image data of a static picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium) or sent by the radio frequency unit 101 or the network module 102. The microphone 1042 may receive a sound and may process the sound into audio data. The processed audio data can be converted into a format that can be sent to a mobile communication base station through the radio frequency unit 101 in a telephone call mode, for outputting.

The terminal 100 further includes at least one sensor 105, for example, an optical sensor, a motion sensor, and another sensor. Specifically, the optical sensor includes an ambient light sensor and a proximity sensor. The ambient light sensor may adjust brightness of a display panel 1061 based on intensity of ambient light. The proximity sensor may turn off the display panel 1061 and/or backlight when the terminal 100 moves close to an ear. As a type of motion sensor, an accelerometer sensor may detect values of accelerations in various directions (there are usually three axes), may detect for a value and a direction of gravity when the terminal is still, and may be configured to recognize a posture of the terminal (for example, landscape/portrait mode switching, a related game, or magnetometer posture calibration), provide a function related to vibration recognition related function (for example, a pedometer or a keystroke), or the like. The sensor 105 may further include a fingerprint sensor, a pressure sensor, an iris sensor, a molecular sensor, a gyroscope, a barometer, a hygrometer, a thermometer, or an infrared sensor. Details are not described herein.

The display unit 106 is configured to display information input by the user or information provided for the user. The display unit 106 may include a display panel 1061, and the display panel 1061 may be configured in the form of a liquid crystal display (Liquid Crystal Display, LCD), an organic light-emitting diode (Organic Light-Emitting Diode, OLED), or the like.

The user input unit 107 may be configured to receive entered numerical or character information, and generate key signal input that is related to a user setting and function control of the terminal. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction and position of the user, detects a signal generated by a touch operation, and transmits the signal to the touch controller. The touch controller receives touch information from the touch detection apparatus, converts the touch information into point coordinates, and sends the point coordinates to the processor 1010; and receives and executes a command sent by the processor 1010. In addition, the touch panel 1071 may be implemented in a plurality of forms, for example, as a resistive, capacitive, infrared, or surface acoustic wave touch panel. The user input unit 107 may further include other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Further, the touch panel 1071 may cover the display panel 1061. After detecting a touch operation on or near the touch panel 1071, the touch panel 1071 transmits the touch operation to the processor 1010 to determine a type of a touch event. Then the processor 1010 provides corresponding visual output on the display panel 1061 based on the type of the touch event. Although the touch panel 1071 and the display panel 1061 serve as two independent components to implement input and output functions of the terminal in FIG. 10, in some embodiments, the touch panel 1071 and the display panel 1061 may be integrated to implement the input and output functions of the terminal. This is not specifically limited herein.

The interface unit 108 is an interface for connecting an external apparatus to the terminal 100. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 108 may be configured to receive input (for example, data information and electric power) from the external apparatus, and transmit the received input to one or more elements in the terminal 100; or may be configured to transmit data between the terminal 100 and the external apparatus.

The memory 109 may be configured to store a software program and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, and may further include a non-volatile memory, for example, at least one magnetic disk storage device, a flash memory device, or other volatile solid-state storage devices.

The processor 1010 is a control center of the terminal, connects to various parts of the entire terminal by using various interfaces and lines, and executes various functions and data processing of the terminal by running or executing a software program and/or a module stored in the memory 109 and invoking data stored in the memory 109, so as to perform overall monitoring on the terminal. The processor 1010 may include one or more processing units. Optionally, the processor 1010 may integrate an application processor and a modem processor. The application processor mainly processes an operating system, a user interface, an application program, and the like. The modem processor mainly processes wireless communications. It may be understood that the modem processor may alternatively not be integrated into the processor 1010.

The terminal 100 may further include a power supply 1011 (for example, a battery) that supplies power to each component. Optionally, the power supply 1011 may be logically connected to the processor 1010 by using a power management system, so as to implement functions such as charging management, discharging management, and power consumption management by using the power management system.

In addition, the terminal 100 may include some functional modules that are not shown. Details are not described herein.

Optionally, some embodiments of this disclosure further provides a terminal, including a processor 1010, a memory 109, and a computer program stored in the memory 109 and capable of running on the processor 1010. When the computer program is executed by the processor 1010, the processes of the foregoing embodiments of the information transmission method are implemented, and a same technical effect can be achieved. To avoid repetition, details are not described herein again. The terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (Radio Access Network, RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (Personal Communication Service, PCS) phone, a cordless telephone set, a session initiation protocol (Session Initiated Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

Some embodiments of this disclosure further provide a computer-readable storage medium, where the computer-readable storage medium stores a computer program. When the computer program is executed by a processor, the processes of the foregoing embodiments of the information transmission method are implemented, and a same technical effect can be achieved. To avoid repetition, details are not described herein again. The computer-readable storage medium is, for example, a read-only memory (Read-Only Memory, ROM), a random access memory (Random Access Memory, RAM), a magnetic disk, or an optical disk.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in the order of description in time order, but do not need to be performed necessarily in time order, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of a computing apparatus. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general-purpose apparatus. Therefore, the objective of this disclosure may also be achieved by merely providing a program product including program code for implementing the method or apparatus. To be specific, such a program product also constitutes this disclosure, and a storage medium storing such a program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in the sequence of description in time order, but do not need to be performed necessarily in time order. Some steps may be performed in parallel or independently.

The foregoing descriptions are merely specific implementations of this disclosure. It should be noted that persons of ordinary skill in the art may make several improvements or polishing without departing from the principle of this disclosure and the improvements and polishing shall fall within the protection scope of this disclosure.

What is claimed is:

1. An information transmission method, comprising:
   receiving, by a network device, a preamble;
   receiving an uplink signal on a target multiple access resource;
   determining a target terminal based on the uplink signal; and
   determining target uplink information of the target terminal based on a target multiple access (MA) signature, wherein the target multiple access resource is determined based on the preamble, and/or the target MA signature is determined based on the preamble,
   wherein at least one preamble corresponds to one multiple access resource, and/or at least one preamble corresponds to one MA signature.

2. The information transmission method according to claim 1, wherein before the step of receiving a preamble, the method further comprises:
   configuring at least one preamble for the target terminal.

3. The information transmission method according to claim 1, wherein before the step of receiving an uplink signal on a target multiple access resource, the method further comprises:
   configuring at least one multiple access resource for the target terminal.

4. The information transmission method according to claim 1, wherein before the step of determining target uplink information of the target terminal based on a target multiple access (MA) signature, the method further comprises:
   configuring at least one MA signature for the target terminal.

5. The information transmission method according to claim 1, wherein a bandwidth part (BWP) in which the target multiple access resource is located is the same as a BWP in which the preamble is located.

6. The information transmission method according to claim 1, wherein the target multiple access resource comprises at least one frequency domain transmission unit, and the frequency domain transmission unit comprises: a resource block group (RBG), a resource block (RB), and a resource element group (REG) or a resource element (RE).

7. The information transmission method according to claim 6, wherein the frequency domain transmission unit is determined based on a sub-carrier spacing of the BWP in which the target multiple access resource is located.

8. A network device, wherein the network device comprises a processor, a memory, and a program stored in the memory and running on the processor, wherein when the processor executes the program, the processor is configured to perform steps of the information transmission method according to claim 1.

9. The network device according to claim 8, wherein:
before the step of receiving a preamble, the method further comprises: configuring at least one preamble for the target terminal; and/or,
before the step of receiving an uplink signal on a target multiple access resource, the method further comprises: configuring at least one multiple access resource for the target terminal; and/or,
before the step of determining target uplink information of the target terminal based on a target multiple access (MA) signature, the method further comprises: configuring at least one MA signature for the target terminal.

10. The network device according to claim 8, wherein:
a bandwidth part (BWP) in which the target multiple access resource is located is the same as a BWP in which the preamble is located; and/or,
the target multiple access resource comprises at least one frequency domain transmission unit, and the frequency domain transmission unit comprises: a resource block group (RBG), a resource block (RB), and a resource element group (REG) or a resource element (RE).

11. The network device according to claim 10, wherein the frequency domain transmission unit is determined based on a sub-carrier spacing of the BWP in which the target multiple access resource is located.

12. A non-transitory computer-readable storage medium, wherein the non-transitory computer-readable storage medium stores a computer program, and the computer program, when executed by a processor, causes the processor to perform steps of the information transmission method according to claim 1.

13. An information transmission method, comprising:
receiving, by a network device, a preamble;
receiving an uplink signal on a target multiple access resource;
determining a target terminal based on the uplink signal; and
determining target uplink information of the target terminal based on a target multiple access (MA) signature, wherein the target multiple access resource is determined based on the preamble, and/or the target MA signature is determined based on the preamble,
wherein a bandwidth part (BWP) in which the target multiple access resource is located is the same as a BWP in which the preamble is located.

14. An information transmission method, comprising:
sending, by a terminal, a preamble; and
sending, by the terminal, an uplink signal on a target multiple access resource by using a target multiple access (MA) signature, wherein the uplink signal carries a terminal identifier of the terminal, and the target multiple access resource corresponds to the preamble, and/or the target MA signature corresponds to the preamble,
wherein at least one preamble corresponds to one multiple access resource, and/or at least one preamble corresponds to one MA signature.

15. A terminal, wherein the terminal comprises a processor, a memory, and a program stored in the memory and running on the processor, wherein when the processor executes the program, the processor is configured to perform steps of the information transmission method according to claim 14.

16. The terminal according to claim 15, wherein before the step of sending a preamble, the method further comprises:
obtaining at least one preamble configured by a network device.

17. The terminal according to claim 15, wherein before the step of sending an uplink signal on a target multiple access resource by using a target multiple access MA signature, the method further comprises:
obtaining at least one multiple access resource configured by the network device;
and/or,
obtaining at least one MA signature configured by a network device.

18. The terminal according to claim 15, wherein a bandwidth part (BWP) in which the target multiple access resource is located is the same as a BWP in which the preamble is located.

19. The terminal according to claim 15, wherein the target multiple access resource comprises at least one frequency domain transmission unit, and the frequency domain transmission unit comprises: a resource block group (RBG), a resource block (RB), and a resource element group (REG) or a resource element (RE).

20. The terminal according to claim 15, wherein the uplink signal carries a demodulation reference signal DMRS, and at least one preamble corresponds to one DMRS.

* * * * *